(12) United States Patent
Wu et al.

(10) Patent No.: US 10,320,667 B2
(45) Date of Patent: Jun. 11, 2019

(54) NOTIFICATION METHOD AND DEVICE AND ACQUISITION DEVICE FOR MAC ADDRESS OF ESADI

(71) Applicant: ZTE CORPORATION, Shenzhen, Guangdong Province (CN)

(72) Inventors: Qiang Wu, Shenzhen (CN); Ting Liao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 38 days.

(21) Appl. No.: 15/327,382

(22) PCT Filed: Oct. 24, 2014

(86) PCT No.: PCT/CN2014/089496
§ 371 (c)(1),
(2) Date: May 12, 2017

(87) PCT Pub. No.: WO2015/117413
PCT Pub. Date: Aug. 13, 2015

(65) Prior Publication Data
US 2017/0244634 A1    Aug. 24, 2017

(30) Foreign Application Priority Data

Jul. 24, 2014    (CN) .......................... 2014 1 0357027

(51) Int. Cl.
*H04L 29/12*    (2006.01)
*H04L 12/721*    (2013.01)
(Continued)

(52) U.S. Cl.
CPC .............. *H04L 45/66* (2013.01); *H04L 45/02* (2013.01); *H04L 45/245* (2013.01); *H04L 61/6022* (2013.01); *Y02D 50/30* (2018.01)

(58) Field of Classification Search
CPC ....... H04L 45/245; H04L 49/25; H04L 45/28; H04L 49/70; H04L 41/12; H04L 45/586;
(Continued)

(56) References Cited

U.S. PATENT DOCUMENTS

2013/0336164 A1* 12/2013 Yang ..................... H04L 47/125
370/255
2014/0043972 A1* 2/2014 Li ........................... H04L 45/50
370/230
(Continued)

FOREIGN PATENT DOCUMENTS

CN    102244614 A    11/2011
CN    102404181 A    4/2012
(Continued)

OTHER PUBLICATIONS

H. Zhai, ZTE, et al.; RBridge: Pseudo-Nickname for Active-active Access draft-hu-trill-pseudonode-nickname-08; Jun. 25, 2014; TRILL Working Group, Internet-Draft, Intended Status: Standards Track, Expires: Dec. 27, 2014. XP15099770A.
(Continued)

*Primary Examiner* — Asad M Nawaz
*Assistant Examiner* — Najeeb Ansari
(74) *Attorney, Agent, or Firm* — Ling Wu; Stephen Yang; Ling and Yang Intellectual Property

(57) ABSTRACT

The present document discloses a notification method and device and an acquisition device for a MAC address of ESADI. The method includes: a RB issuing a MAC address which is reachable natively by the RB via a LSP of the ESADI; and Step 204: the RB notifying multiple RBs which correspond to the MAC address and belong to the same MC-LAG by way of a MAC-Reachability TLV extension of the LSP. The present document solves the problem in the related technology that the RB is unable to notify the remote (Continued)

RB of native multi-chassis RB IDs when accessing the TRILL network by a multi-chassis access, so that the remote RB can acquire which RBs belong to the same MC-LAG, thereby improving the flexibility of the processing manner.

11 Claims, 5 Drawing Sheets

(51) Int. Cl.
    *H04L 12/709*     (2013.01)
    *H04L 12/751*     (2013.01)

(58) Field of Classification Search
    CPC ..... H04L 12/4641; H04L 45/66; H04L 45/74; H04L 45/02; H04L 12/4633
    See application file for complete search history.

(56) References Cited

U.S. PATENT DOCUMENTS

| | | | | |
|---|---|---|---|---|
| 2014/0204760 A1* | 7/2014 | Durrani | .................. | H04L 47/41 370/236 |
| 2014/0348166 A1* | 11/2014 | Yang | .................... | H04L 45/124 370/392 |
| 2014/0369230 A1* | 12/2014 | Nallur | .................... | H04L 45/02 370/254 |
| 2015/0139233 A1* | 5/2015 | Zhai | .................... | H04L 12/4641 370/392 |
| 2015/0372862 A1* | 12/2015 | Namihira | ................ | H04L 12/44 370/254 |

FOREIGN PATENT DOCUMENTS

| | | |
|---|---|---|
| CN | 102710500 A | 10/2012 |
| CN | 102724120 A | 10/2012 |
| CN | 102857441 A | 1/2013 |
| CN | 102868614 A | 1/2013 |
| CN | 103428088 A | 12/2013 |
| CN | 103780437 A | 5/2014 |
| CN | 103944818 A | 7/2014 |

OTHER PUBLICATIONS

A. Banerjee, Cisco Systems, et al.; Extensions to IS-IS for Layer-2 Systems; Apr. 2011; Internet Engineering Task Force (IETF), Request for Comments: 6165, Category: Standards Track, ISSN: 2070-1721. XP55390601A.

Hongjun Zhai, ZTE, et al.; Jun. 7, 2014; TRILL: ESADI (End Station Address Distribution Information) Protocol <draft-ietf-trill-esadi-09.txt>;TRILL Working Group, Internet—Draft, Intended status: Proposed Standard, Updates: 6325, Expires: Dec. 6, 2014. XP55424835A.

\* cited by examiner

```
+-+---+-+-+-+-+-+-+-+-+-+-+-+-+-+-...+-+-+-+-+-+-+-+-+-+-+-+-+-+-+---+-...-+-+
|     MAC (1)        (6 bytes)     | Length    (1 byte) |sub-tlv |
+-+---+-+-+-+-+-+-+-+-+-+-+-+-+-+-...+-+-+-+-+-+-+-+-+-+-+-+-+-+-+---+-...-+-+
```

FIG. 6

```
+-+-+-+-+-+-+-+-+
|Type=SYSTEM-ID MC-LAG|                (1 byte)
+-+-+-+-+-+-+-+-+
|     Length     |                     (1 byte)
+-+-+-+-+-+-+-+-+-+-+-+-+-+-+-+-+-...+-+-+-+-+-+-+-+-+-+-+-+-+-+-+-+
|          SYSTEM ID (1)             (6 bytes)                     |
+-+-+-+-+-+-+-+-+-+-+-+-+-+-+-+-+-...+-+-+-+-+-+-+-+-+-+-+-+-+-+-+-+
|                  . . . . . . . . . . . . . .                     |
+-+-+-+-+-+-+-+-+-+-+-+-+-+-+-+-+-...+-+-+-+-+-+-+-+-+-+-+-+-+-+-+-+
|          SYSTEM ID (N)             (6 bytes)                     |
+-+-+-+-+-+-+-+-+-+-+-+-+-+-+-+-+-...+-+-+-+-+-+-+-+-+-+-+-+-+-+-+-+
```

FIG.7

NOTIFICATION METHOD AND DEVICE AND ACQUISITION DEVICE FOR MAC ADDRESS OF ESADI

TECHNICAL FIELD

The present document relates to the field of communications, and more particularly to a notification method and device and an acquisition device for a Media Access Control (MAC) address of End Station Address Distribution Information (ESADI).

BACKGROUND

The Transparent Interconnection of Lots of Links (TRILL) protocol is already an international standard protocol. With many years of gradual evolution, the Layer 3 routing technology is applied to the Layer 2 transmission, which realizes the large-scale Layer 2 cloud, meets the growing demands on convergence networks and very large data centers, and builds an excellent and efficient Layer 2 broadcast domain. The TRILL uses the End Station Address Distribution Information (i.e., ESADI for short) as an optical protocol to complete the learning of a Media Access Control (i.e., MAC for short) address of an end station.

The End Station Address Distribution Information (i.e., ESADI for short) protocol is an optical protocol for the learning of an end station which is evolved from an Intermediate System to Intermediate System (ISIS), but has a higher priority compared with a stream learning manner. After the ESADI protocol establishes an ESADI neighbor by means of interactive negotiation with a Link State Protocol Data Unit (LSP) of the TRILL protocol, each Routing Bridge (RB) generates the LSP of the ESADI to carry an end address which can be reached by the RB itself, namely the MAC address, and sends the LSP to the network. Only the RB taking itself as a neighbor saves an LSP packet of the ESADI to form a Link State Database (LSDB). In such as manner, the RB learns the end address of the ESADI neighbor, namely the MAC address. The finally learned MAC ITEM of TRILL is <MAC; nickname (the nickname of RB)>, which means that if a native Ethernet frame needs to be sent to the MAC address, the TRILL protocol can be selected to send it to the RB with the nickname in a unicast way.

The native multi-chassis access is a very common network deployment scenario in a data center; in the scenario, a terminal accesses a network through two or more than two links, interfaces on devices forming a group of multi-chassis link accesses are considered to join the same Link Aggregation Group (LAG), and these devices are considered to be member devices in the same LAG. Specifically for a TRILL network, the terminal accesses the TRILL network through multiple links and multiple edge ingress RBs, and these uplink links and ingress RBs form a multi-chassis group. A link aggregation protocol (for example, IEEE 802.1AX-REV) runs on the RB. The packet sent by the terminal may be encapsulated by different RBs in the multi-chassis group, so when a remote egress RB learns the MAC, the ingress-nickname of the MAC ITEM flip-flops frequently because the same MAC address can learn the mapping of only one overlay network device Identity (ID), which causes the instability of a MAC address table, and even causes disorder of returned flow and packet loss, thereby causing the interruption of a session.

FIG. 1 is a schematic diagram of a network scenario according to the related technology. As shown in FIG. 1, a client side device 1 is connected to both the RB1 and the RB2, then the links of the terminal which are connected to the RB1 and the RB2 respectively form a multi-chassis group. When the client side device 1 communicates with the client side device 3, the two links of the RB1 and the RB2 connected to the client side device 1 form a multi-chassis binding relationship. Firstly the MAC1 on the client side device 1 forms a TRILL encapsulation through the RB1 and then reaches the RB5. The mapping relationship between the nickname of the RB1 and the MAC1 is learned on the RB5. When the flow of the MAC1 reaches the RB5 from the RB2, the mapping relationship between the nickname of the RB2 and the MAC1 is learned on the RB5, and the original mapping relationship between the nickname of the RB1 and the MAC1 is covered. When both the RB1 and the RB2 have the flows of the MAC1 continuously that are sent to the RB5, the MAC1 ITEM on the RB5 is refreshed and covered continuously. In addition, although there are multiple RBs, namely the RB1 and the RB2, that can reach the terminal of the MAC1, the data flow source RB5 only selects one or the RBs as the destination RB to forward data instead of freely selecting both the RB1 and the RB2 to communicate, so the efficient utilization of bandwidth cannot be realized, and the loads of RB1 and the RB2 cannot be shared.

Aiming at the problem in the related technology that the RB is unable to notify a remote RB of a native multi-chassis RB ID when accessing the TRILL network in the manner of multi-chassis access, no efficient solutions are put forward at present.

SUMMARY

Embodiments of the present document provides a notification method and device and an acquisition device for a MAC address of ESADI, so as to at least solve the problem in the related technology that a RB is unable to notify a remote RB of a native multi-chassis RB IDs when accessing a TRILL network in a manner of multi-chassis access.

According to an embodiment of the present document, a notification method for a MAC address of ESADI is provided, which includes: issuing, by a Routing Bridge (RB), a MAC address which is reachable natively by the RB via a Link State Protocol Data Unit (LSP) of the ESADI; and notifying, by the RB, multiple RBs which correspond to the MAC address and belong to a same Multi-Chassis Link Aggregation Group (MC-LAG) by way of a MAC-Reachability Type Length Value (TLV) extension of the LSP.

Alternatively, notifying, by the RB, multiple RBs which correspond to the MAC address and belong to the same MC-LAG by way of the MAC-Reachability TLV extension of the LSP comprises: carrying, by the RB, IDs of other RBs which belong to the same MC-LAG as the RB in a MAC ITEM of a MAC-Reachability TLV of the LSP, wherein the MAC ITEM is an extension of a MAC address field in the MAC-Reachability TLV.

Alternatively, the MAC ITEM contains a MAC address with six bytes, a total length of a sub-TLV and one or more sub-TLVs, wherein, the one or more sub-TLVs contain the sub-TLVs which are set to describe the IDs of the other RBs belonging to the same MC-LAG as the RB.

Alternatively, the IDs of the other RBs belonging to the same MC-LAG as the RB comprise: SYSTEM-IDs of the other RBs; and/or, nicknames of the other RBs.

Alternatively, the sub-TLVs which are set to describe the IDs of the other RBs belonging to the same MC-LAG as the RB are SYSTEM-ID sub-TLVs of the other RBs belonging to the same MC-LAG as the RB, wherein the sub-TLVs contain the SYSTEM-IDs which denote the other RBs belonging to the same MC-LAG as the RB in an ESADI ISIS.

Alternatively, the sub-TLVs which are set to describe the IDs of the other RBs belonging to the same MC-LAG as the RB are nickname sub-TLVs of the other RBs belonging to the same MC-LAG as the RB, wherein the sub-TLVs contain the nicknames which denote the other RBs belonging to the same MC-LAG as the RB in an ESADI ISIS.

Alternatively, notifying, by the RB, by way of the MAC-Reachability TLV extension of the LSP comprises: the notifying by way of the extension is defined through a specified type, or is identified through setting a RESV field in the MAC-Reachability TLV.

Alternatively, after issuing, by the RB, the MAC address which is reachable natively by the RB via the LSP of the ESADI, the method further comprises: receiving, by a remote RB, the MAC-Reachability TLVs of the LSPs of the multiple RBs; determining, by the remote RB, that the MAC of the multiple RBs have a relationship of the same MC-LAG according to the MAC-Reachability TLVs of the LSPs of the multiple RBs, and combining the multiple RBs into a MAC address providing unit; and calculating, by the remote RB, a confidence of the MAC address providing unit, wherein the confidence is used for participating in a MAC ITEM calculation of Transparent Interconnection of Lots of Links (TRILL) of the MAC.

Alternatively, determining, by the remote RB, that the MAC of the multiple RBs have a relationship of the same MC-LAG according to the MAC-Reachability TLVs of the LSPs of the multiple RBs comprises: acquiring, by the remote RB, the IDs of the other RBs belonging to the same MC-LAG as a first RB, wherein the IDs are carried in the MAC ITEM of the MAC-Reachability TLV of each of first RBs in the multiple RBs, and respectively determining that the MAC ITEMs of the other RBs corresponding to the IDs also carry the ID of the first RB.

Alternatively, calculating, by the remote RB, the confidence of the MAC address providing unit comprises: calculating, by the remote RB, that the confidence of the MAC address providing unit is the confidence of the RB with the highest confidence in the RBs belonging to the same MC-LAG, wherein the confidence is used for a selection and/or decision among multiple MAC address providing units in the MAC ITEM calculation of the TRILL.

According to another embodiment of the present document, a notification device for a MAC address of ESADI is provided, which is located in an RB and includes: a notification module, arranged to issue a MAC address which is reachable natively by the RB via an LSP of the ESADI, and notify multiple RBs which correspond to the MAC address and belong to a same MC-LAG by way of a MAC-Reachability TLV extension of the LSP.

According to another embodiment of the present document, an acquisition device for a MAC address of ESADI is provided, which is located in a remote RB and includes: a receiving module, arranged to receive MAC-Reachability TLVs of LSPs of multiple RBs, wherein the multiple RBs issue MAC addresses which are reachable natively by the multiple RBs via the LSPs of the ESADI, and notify multiple RBs which correspond to the MAC addresses and belong to the same MC-LAG by way of a MAC-Reachability TLV extension of the LSPs; a determination module, arranged to determine that the MAC of the multiple RBs have a relationship of the same MC-LAG according to the MAC-Reachability TLVs of the LSPs of the multiple RBs, and combine the multiple RBs into a MAC address providing unit; and a calculation module, arranged to calculate a confidence of the MAC address providing unit, wherein the confidence is used for participating in a MAC ITEM calculation of TRILL of the MAC.

According to the embodiments of the present document, the RB issues the MAC address which is reachable natively by the RB via the LSP of the ESADI, and the RB notifies multiple RBs which correspond to the MAC address and belong to the same MC-LAG by way of the MAC-Reachability TLV extension of the LSP. In such a manner, the problem in the related technology that the RB is unable to notify the remote RB of native multi-chassis RB IDs when accessing the TRILL network by a multi-chassis access is solved, so that the remote RB can acquire which RBs belong to the same MC-LAG, thereby improving the flexibility of the processing manner.

BRIEF DESCRIPTION OF DRAWINGS

The accompanying drawings described here are used for providing a deeper understanding of the present document, and constitute a part of the present application; schematic embodiments of the present document and description thereof are used for illustrating the present document and not intended to form an improper limit to the present document. In the accompanying drawings:

FIG. 5 (b) is schematic diagram two of a MAC-Reachability TLV extension according to an alternative embodiment of the present document;

FIG. 6 is a schematic diagram of a MAC ITEM extension according to an alternative embodiment of the present document;

FIG. 7 is a schematic diagram of a SYSTEM-ID MC-LAG sub-TLV according to an alternative embodiment of the present document;

DETAILED DESCRIPTION

The present document is elaborated below in combination with the accompanying drawings and embodiments. It should be illustrated that, the embodiments in the application and the features in the embodiments can be combined with each other without conflict.

Figure 2:
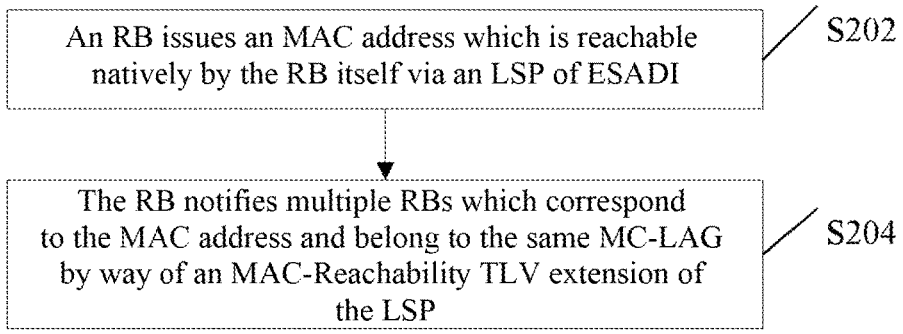
FIG. 2 is a flowchart of a notification method for a MAC address of ESADI according to an embodiment of the present document.

In the present embodiment, a notification method for a MAC address of ESADI is provided. FIG. 2 is a flowchart of a notification method for a MAC address of ESADI according to an embodiment of the present document. As shown in FIG. 2, the method includes the following step.

Step S202: an RB issues a MAC address which is reachable natively by the RB itself via an LSP of the ESADI.

Step S204: the RB notifies multiple RBs which correspond to the MAC address and belong to the same MC-LAG by way of a MAC-Reachability TLV extension of the LSP.

In the present embodiment, through the above steps, the RB issues the MAC address which is reachable natively by the RB itself via the LSP of the ESADI, and notifies the multiple RBs which correspond to the MAC address and belong to the same MC-LAG by way of the MAC-Reachability TLV extension of the LSP. By extending the existing TLV, extension and notification of the RBs belonging to the same MC-LAG is realized, and the problem in the related technology that the RB is unable to notify the remote RB of native multi-chassis RB IDs when accessing the TRILL network by a multi-chassis access is solved, so that the remote RB can acquire which RBs belong to the same MC-LAG, thereby improving the flexibility of the processing manner.

As an alternative implementation mode, the RB may perform the above extending and notifying in a MAC ITEM of the MAC-Reachability TLV of the LSP. Specifically, the RB may carry in the MAC ITEM the IDs of other RBs belonging to the same MC-LAG as the RB, wherein the MAC ITEM is the extension of a MAC address field in the MAC-Reachability TLV.

In an exemplary embodiment, the MAC ITEM may include the MAC address with six bytes, the total length of a sub-TLV and one or more sub-TLVs, wherein the one or more sub-TLVs contain the sub-TLVs which are set to describe the IDs of the other RBs belonging to the same MC-LAG as the RB. The IDs of the other RBs belonging to the same MC-LAG as the RB may include SYSTEM IDs of the other RBs, and/or, nicknames of the other RBs.

In an exemplary embodiment, the sub-TLVs which are set to describe the IDs of the other RBs belonging to the same MC-LAG as the RB may be as follows: (1) SYSTEM-ID sub-TLVs of the other RBs belonging to the same MC-LAG as the RB, wherein the sub-TLVs contain the SYSTEM IDs which denote the other RBs belonging to the same MC-LAG as the RB in the ESADI ISIS. And/or, (2) nickname sub-TLVs of the other RBs belonging to the same MC-LAG as the RB, wherein the sub-TLVs contain the nicknames which denote the other RBs belonging to the same MC-LAG as the RB in the ESADI ISIS.

In an exemplary embodiment, the extension and notification may be defined through a new specified type, that is, a new TLV type is defined by setting a type field, which is called Extended MAC-Reachability TLV (the extended MAC may reach TLV), and is set as the notification of MAC ITEM reachability information. The new type setting of the TLV specifies the TVL as the Extended MAC-Reachability TLV. Or the extension and notification is identified through RESV field setting in the MAC-Reachability TLV.

As an alternative implementation mode, after the RB issues the MAC address which is reachable natively by the RB via the LSP of the ESADI, the method further includes the following steps. A remote RB receives the MAC-Reachability TLVs of the LSPs of the multiple RBs. The remote RB determines that the MAC of the multiple RBs have a relationship of the same MC-LAG according to the MAC-Reachability TLVs of the LSPs of the multiple RBs, and combines the multiple RBs into a MAC address providing unit. The remote RB calculates a confidence of the MAC address providing unit, wherein the confidence is used for participating in a MAC ITEM calculation of the TRILL of the MAC.

The remote RB determining that the MAC of the multiple RBs have a relationship of the same MC-LAG according to the MAC-Reachability TLVs of the LSPs of the multiple RBs can be that: the remote RB acquires the IDs of the other RBs belonging to the same MC-LAG as a first RB, wherein the IDs are carried in the MAC ITEM of the MAC-Reachability TLV of each of first RBs in the multiple RBs, and respectively determines that the MAC ITEMs of the other RBs corresponding to the IDs also carry the ID of the first RB.

In an exemplary embodiment, the remote RB calculating the confidence of the MAC address providing unit includes the following steps. The remote RB calculates that the confidence of the MAC address providing unit is the confidence of the RB with the highest confidence in the RBs belonging to the same MC-LAG, herein the confidence is used for a selection and/or decision among multiple MAC address providing units in the MAC ITEM calculation of the TRILL.

Corresponding to the above method, an embodiment also provides a notification device for a MAC address of ESADI, which is located in a RB and is arranged to implement the above embodiments and alternative implementation modes, which will not be elaborated herein. The term "module" used below can realize a combination of software and/or hardware with an intended function. Although the device described in the following embodiment is better realized through software the realization through hardware or a combination of software and hardware is also possible and conceived.

Figure 3:
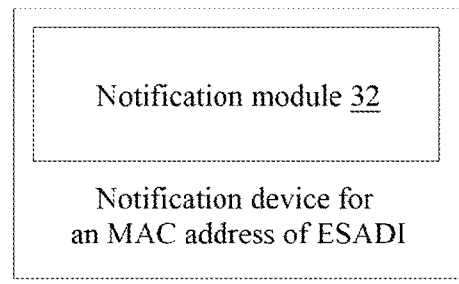
FIG. 3 is a structure diagram of a notification device for a MAC address of ESADI according to an embodiment of the present document.

FIG. 3 is a structure diagram of a notification device for a MAC address of ESADI according to an embodiment of the present document. As shown in FIG. 3, the device includes a notification module 32.

The notification module 32 is arranged to issue the MAC address which is reachable natively by the RB itself via the LSP of the ESADI, and notify multiple RBs which correspond to the MAC address and belong to the same MC-LAG by way of the MAC-Reachability TLV extension of the LSP.

Figure 9:
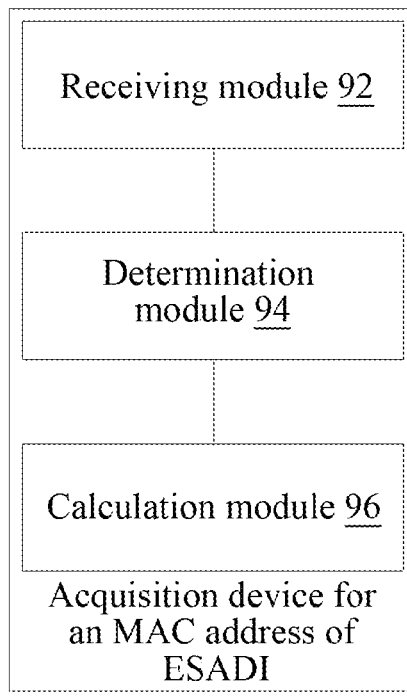
FIG. 9 is a structure diagram of an acquisition device for a MAC address of ESADI according to an embodiment of the present document.

In an embodiment, an acquisition device for a MAC address of ESADI is also provided, which is located in a remote RB. FIG. 9 is a structure diagram of an acquisition device for a MAC address of ESADI according to an embodiment of the present document. As shown in FIG. 9, the device includes the following modules.

A receiving module 92 is arranged to receive the MAC-Reachability TLVs of the LSPs of multiple RBs, herein the multiple RBs issue the MAC addresses which are reachable natively by the multiple RBs themselves via the LSPs of the ESADI, and notify multiple RBs which correspond to the MAC addresses and belong to the same MC-LAG by way of the MAC-Reachability TLV extension of the LSPs. A determination module 94 is connected to the receiving module 92, and is arranged to determine that the MAC of the multiple RBs have a relationship of the same MC-LAG according to the MAC-Reachability TLVs of the LSPs of the multiple RBs, and combine the multiple RBs into a MAC address providing unit. A calculation module 96 is connected to the determination module 94, and is arranged to calculate the confidence of the MAC address providing unit, herein the confidence is used for participating in the MAC ITEM calculation of the TRILL of the MAC.

An elaboration is given below in combination with the alternative embodiments; the following alternative embodiments combine the above embodiments and alternative implementation modes.

In the following alternative embodiments, an ESADI-supported method for learning a native LAG end station address is provided, which is applied to various devices supporting ESADI, such as a network bridge, a switch and a computer host, and etc. In the method, a MAC address field in the MAC-Reachability TLV of the extended protocol is MAC ITEM, and a sub-TLV of an extensible length may be contained in the MAC ITEM. In the alternative embodiment, two new MC-LAG sub-TLVs are contained, one of which is MC-LAG SYSTEM-ID sub-TLV, and the other is MC-LAG nickname sub-TLV, for notifying the SYSTEM ID and nickname of the RB forming the LAG. The ESADI includes the same MACs provided by the RBs in the same LAG, which form a single MAC provider unit to participate in the MAC ITEM calculation of ESADI and issue the selection. Once the confidence of the MAC provider unit of an LAG is the highest, the nicknames of all the provider RBs are written into the format <MAC, VLAN; nickname1, nickname2 . . . nicknameN> and issued to a forwarding plane; the forwarding plane can select the nickname of any RB freely, and encapsulate the nickname into an Ethernet frame to be forwarded to the MAC as the destination nickname, and then forwards the Ethernet frame to the destination RB in a unicast way.

The ESADI-supported method for learning a native LAG end station address provided in the alternative embodiment extends the MAC address field in the MAC-Reachability TLV, and the extended MAC address field is called MAC ITEM; a MAC-Reachability TLV carries multiple MAC ITEMS. After being extended, the MAC-Reachability TLV carrying multiple MAC ITEMS can define a new type TLV, which is called Extended MAC-Reachability TLV. Or it is identified by setting a certain bit in the RESV field in the original MAC-Reachability TLV. For example, the first reservation bit therein is defined as an Extended (E) bit. If it is set as 1, the current MAC-Reachability TLV supports an extended mode carrying multiple MAC ITEMs. If it is set as 0, the current MAC-Reachability TLV does not support the extended mode carrying multiple MAC ITEMs, and still carries multiple MAC addresses. In this application, the latter implementation is adopted as the embodiment for description, that is, the description is given in the manner of defining the E bit in the original MAC-Reachability TLV. Each MAC ITEM contains the MAC address with six bytes, the sub-TLV length of a byte, and one or more sub-TLVs. The sub-TLV length denotes that the MAC ITEM carries the total length of all the sub-TLVs, and the sub-TLV denotes the attribute of the MAC address.

Wherein, two new MC-LAG sub-TLVs are presented in the method, one of which is MC-LAG SYSTEM-ID sub-TLV, and the other is MC-LAG nickname sub-TLV. The two new MC-LAG sub-TLVs are carried in the MAC ITEM of the MAC-Reachability TLV, denoting that a MAC end node address in the MAC ITEM has the MC-LAG attribute, and the MC-LAG sub-TLV contains type, length and value. It is feasible to freely select any mode or use both two modes to notify the MC-LAG attribute of the MAC. The MC-LAG sub-TLV may appear in a MAC ITEM once or twice.

A value domain of the new MC-LAG SYSTEM-ID sub-TLV contains multiple SYSTEM IDs, namely the SYTEM ID denoting the RB in the ESADI ISIS, which indicates that the MAC end node address in the MAC ITEM has the relationship of the MC-LAG with the RBs of these SYSTEM-IDs.

A value domain of the new MC-LAG nickname sub-TLV contains multiple nicknames, namely the nickname denoting the RB in the ESAD ISIS, which indicates that the MAC end node address in the MAC ITEM has the relationship of the MC-LAG with the RBs of these nicknames.

If an interface of an RB and a certain interface of other RBs form the MC-LAG, it is needed to bind the SYSTEM-IDs or nicknames of the other RBs on this interface of the RB, so as to indicate that the other RBs are members of the MC-LAG of the present RB. Certainly, it is feasible to adopt other technical means to detect the LAG, so as to acquire the SYSTEM IDs or nicknames of other RBs having the LAG as the RB its own.

If an interface of an RB and a certain interface of other RBs form the MC-LAG, when notifying in the LSP of the ESADI a native MAC reachable address learned on the interface, the RB contains an MC-LAG sub-TLV in the MAC ITEM in the MAC-Reachability, and the SYSTEM IDs or nicknames of the other RBs in the same LAG as the RB will be listed in the MC-LAG sub-TLV, which indicates that the MAC address has the relationship of the MC-LAG with the RBs of these SYSTEM IDs or nicknames.

If a remote RB receives in the ESADI of a VLAN the same MAC provided by multiple source RBs, any provider RB of the MAC is called a MAC provider unit. By determining the same LAG, namely checking the MAC ITEMs among which RBs of these source RBs carry the MC-LAG sub-TLV containing the SYSTEM ID or nickname, their MACs will be bound as a single MAC provider unit to participate in comparison of the confidence, wherein the confidence is the highest confidence of the member in the LAG. However, different MAC provider units will participate in comparison of the confidence, and the member with the highest confidence will issue the MAC ITEM of TRILL <MAC, VLAN; nickname1, nickname2 . . . nicknameN> to the forwarding plane for use.

If the remote RB learns multiple same MAC ITEMs of TRILL at the same time, when a native Ethernet frame to be forwarded to the MAC address as the destination address is received, it is feasible to freely select, in any way, which source's MAC ITEM of TRILL RB to send a unicast TRILL data packet to the source RB.

For solving the flip-flop problem of the MAC address list caused by the multi-chassis access, the carrying of a multi-chassis access ID is realized by way of the extension in the ESADI protocol which is notified on a TRILL control plane, and an extension ID is denoted by extending the RESV field in the existing MAC-Reachability (MAC-RI) TLV. Specifically, the value of the extension ID may denote multi-chassis, and it is also feasible to denote through the field setting that the carried content attribute has extension. Specifically a multi-chassis attribute ID can be denoted by extending the new item length and the type of sub-TLV. After receiving an ESADI packet carrying the extension ID, a remote egress edge device saves the mapping relationship between multiple overlay network nodes and the MAC address of the client side (aiming at the TRILL network, the mapping relationship between the nicknames of multiple RBs and the same MAC address is saved). The ESADI-supported method for learning a native LAG end station address provided by the alternative embodiment can solve the flip-flop problem of the MAC ITEM, and realizes the mechanism that multiple providing source RBs are selected to freely select and forward data flows reaching a MAC, and achieves load sharing of the destination MAC.

The ESADI-supported method for learning a native LAG end station address provided by the alternative embodiment is elaborated below in combination with the accompanying drawings.

1. TLV extension

Figure 4:
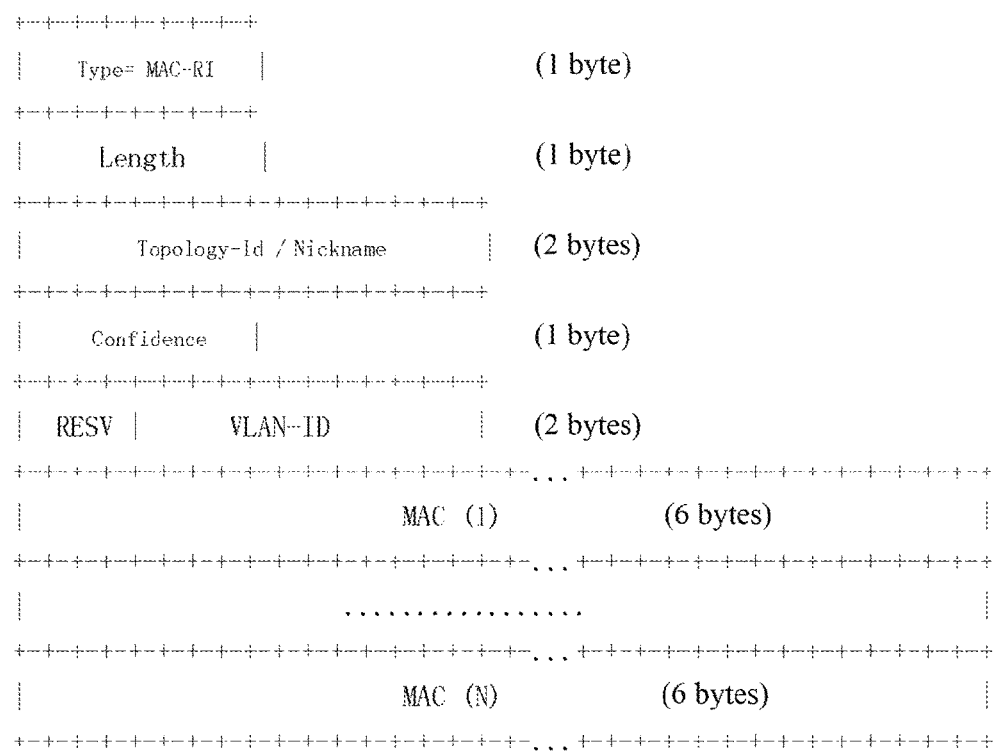
FIG. 4 is a schematic diagram of an original MAC-Reachability TLV in a protocol according to an alternative embodiment of the present document.

FIG. 4 is a schematic diagram of the original MAC-Reachability TLV according to an alternative embodiment of the present document. As shown in FIG. 4, the original MAC-Reachability TLV contains type, length and value. In a value domain, Topology-ID/nickname, Confidence, VLAN-ID, and multiple MAC addresses are included in order. Each MAC address is composed of six bytes.

Figure 5A:
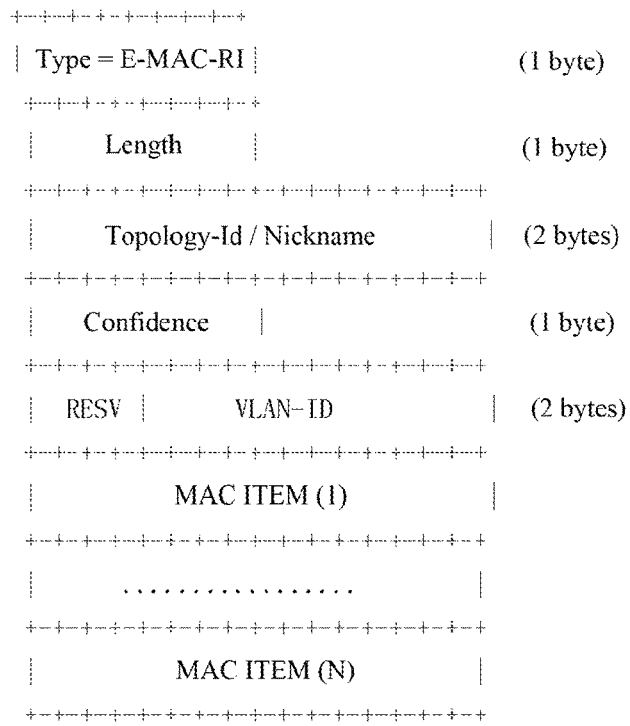
FIG. 5 (a) is schematic diagram one of a MAC-Reachability TLV extension according to an alternative embodiment of the present document.
Figure 5B:
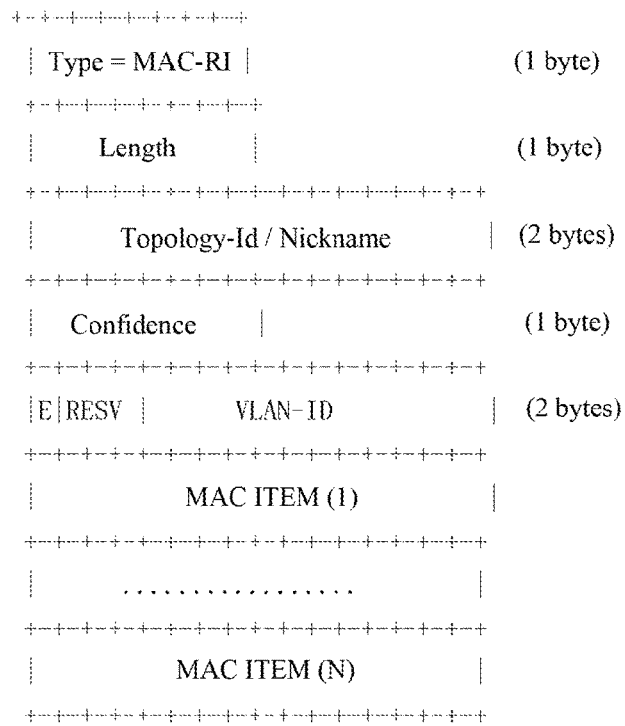

FIG. 5 (a) and FIG. 5 (b) are respectively schematic diagram 1 and schematic diagram 2 of a MAC-Reachability TLV extension according to a alternative embodiment of the present document. As shown in FIG. 5, in the alternative embodiment, the MAC address field in the MAC-Reachability TLV is extended, and is called MAC ITEM after being extended. A MAC-Reachability TLV carries multiple MAC ITEMs. By way of extension, the MAC-Reachability TLV carrying multiple MAC ITEMs can define a new-type TLV, that is, a new TLV type is defined by setting the type field, which is called Extended MAC-Reachability TLV, and is set as the notification of the MAC ITEM reachability information. The new set value of type of the TLV specifies the TLV as the Extended MAC-Reachability TLV, as shown in FIG. 5 (a). Or, a certain bit in the RESV field in the original MAC-Reachability TLV is set to identify, for example, the first reservation bit therein is defined as the E bit. If it is set as 1, the current MAC-Reachability TLV supports the extended mode carrying multiple MAC ITEMs. If it is set as 0, the current MAC-Reachability TLV does not support the extended mode carrying multiple MAC ITEMs, and still carries multiple MAC addresses as shown in FIG. 5 (b). In this application, the latter implementation is adopted as the embodiment for description, that is, the description is given in the manner of defining the E bit in the original MAC-Reachability TLV.

FIG. 6 is a schematic diagram of a MAC ITEM extension according to an alternative embodiment of the present document. As shown in FIG. 6, each MAC ITEM contains the MAC address with six bytes, the sub-TLV length of a byte, and one or more sub-TLVs. The sub-TLV length denotes that the MAC ITEM carries the total length of all the sub-TLVs, and the sub-TLV denotes the attribute of the MAC address.

Two new MC-LAG sub-TLVs are presented in the alternative embodiment, one of which is MC-LAG SYSTEM-ID sub-TLV, and the other is MC-LAG nickname sub-TLV. The two new MC-LAG sub-TLVs are carried in the MAC ITEM of the MAC-Reachability TLV, denoting that the MAC end node address in the MAC ITEM has the MC-LAG attribute, and the MC-LAG sub-TLV contains type, length and value. It is feasible to freely select any mode or use both two modes to notify the MC-LAG attribute of the MAC. The MC-LAG sub-TLV may appear in a MAC ITEM once or twice.

FIG. 7 is a schematic diagram of an SYSTEM-ID MC-LAG sub-TLV according to an alternative embodiment of the present document. As shown in FIG. 7, a new MC-LAG SYSTEM-ID sub-TLV is presented, whose domain value contains multiple SYSTEM-IDs, namely the SYSTEM ID denoting the RB in the ESADI ISIS, which indicates that the MAC end node address in the MAC ITEM has the MC-LAG relationship with the RBs of these SYSTEM-IDs. In the alternative embodiment, the description is given by taking the MC-LAG SYSTEM-ID sub-TLV for example, which is called MC-LAG sub-TLV for short below.

Figure 8:
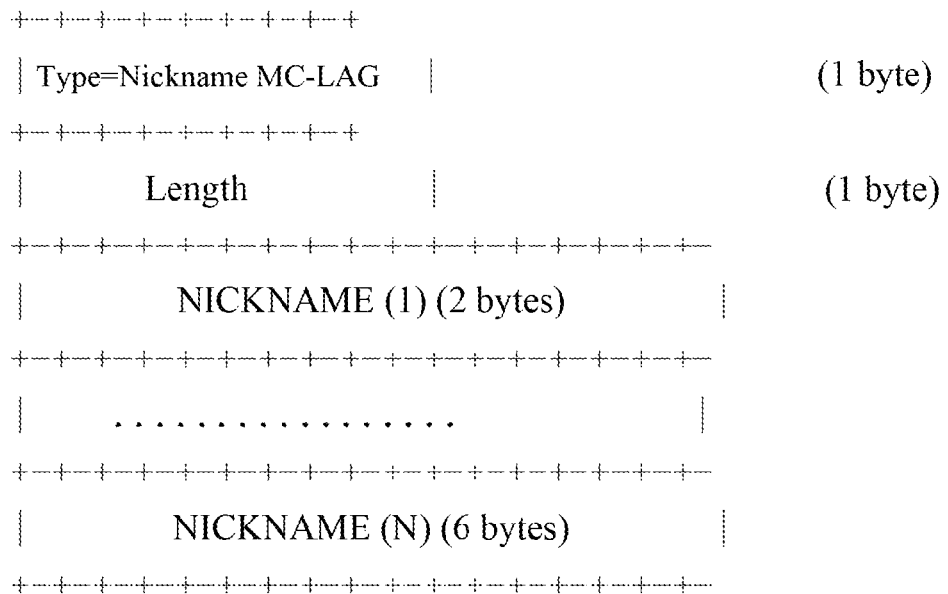
FIG. 8 is a schematic diagram of a nickname MC-LAG sub-TLV according to an alternative embodiment of the present document.

FIG. 8 is a schematic diagram of a nickname MC-LAG sub-TLV according to an alternative embodiment of the present document. As shown in FIG. 8, a new MC-LAG nickname sub-TLV is presented, whose domain value contains multiple nicknames, namely the nickname denoting the RB in the ESADI ISIS, which indicates that the MAC end node address in the MAC ITEM has the MC-LAG relationship with the RBs of these nicknames.

2. Processing method

A. If an interface of an RB and a certain interface of other RBs form the MC-LAG, it is needed to bind the SYSTEM-IDs or nicknames of the other RBs on the present interface of the RB, so as to indicate that the other RBs are members of the MC-LAG of the RB. Certainly, it is feasible to adopt other technical means to detect the LAG; for example, the multi-chassis binding relationship is acquired in the manner of DRNI, so as to acquire the SYSTEM-IDs or nicknames of the other RBs in the same LAG as the RB itself.

B. If an interface of an RB and a certain interface of other RBs form the MC-LAG, when notifying in the LSP of the ESADI the native MAC reachable address learned on the interface, the RB contains an MC-LAG sub-TLV in the MAC ITEM in the MAC-Reachability, and the SYSTEM-IDs or nicknames of the other RBs in the same LAG as the RB will be listed in the MC-LAG sub-TLV, which indicates that the MAC address has the MC-LAG relationship with the RBs of these SYSTEM-IDs or nicknames.

C. If a remote RB receives in the ESADI of a VLAN the same MAC provided by multiple source RBs, any provider RB of the MAC is called a MAC provider unit. By determining the same LAG, namely checking the MAC ITEMs among which RBs of these source RBs carry the MC-LAG sub-TLV containing the SYSTEM-ID or nickname, their MACs will be bound as a single MAC provider unit to participate in comparison of the confidence, wherein the confidence is the highest confidence of the member in the LAG. However, different MAC provider units will participate in comparison of the confidence, and the member with the highest confidence will issue the MAC ITEM of TRILL <MAC, VLAN; nickname1, nickname2 . . . nicknameN> to the forwarding plane for use.

D. If the remote RB learns multiple same MAC ITEMs of TRILL at the same time, when a native Ethernet frame to be forwarded to the MAC address as the destination address is received, it is feasible to freely select, in any way, which source's MAC ITEM of TRILL RB to send a unicast TRILL data packet to the source RB.

The embodiments provided by the alternative embodiments need a special extension of control plane protocol and only need to carry the corresponding multi-chassis access link binding ID on the control plane, so the principle of realization is simple.

The method of the alternative embodiment is further described below through two specific embodiments. In the alternative embodiment, the description is given by taking the MC-LAG SYSTEM-ID sub-TLV for example, which is called the MC-LAG sub-TLV for short below.

Embodiment 1: the whole operation method in the TRILL network in the present alternative document.

Figure 1:
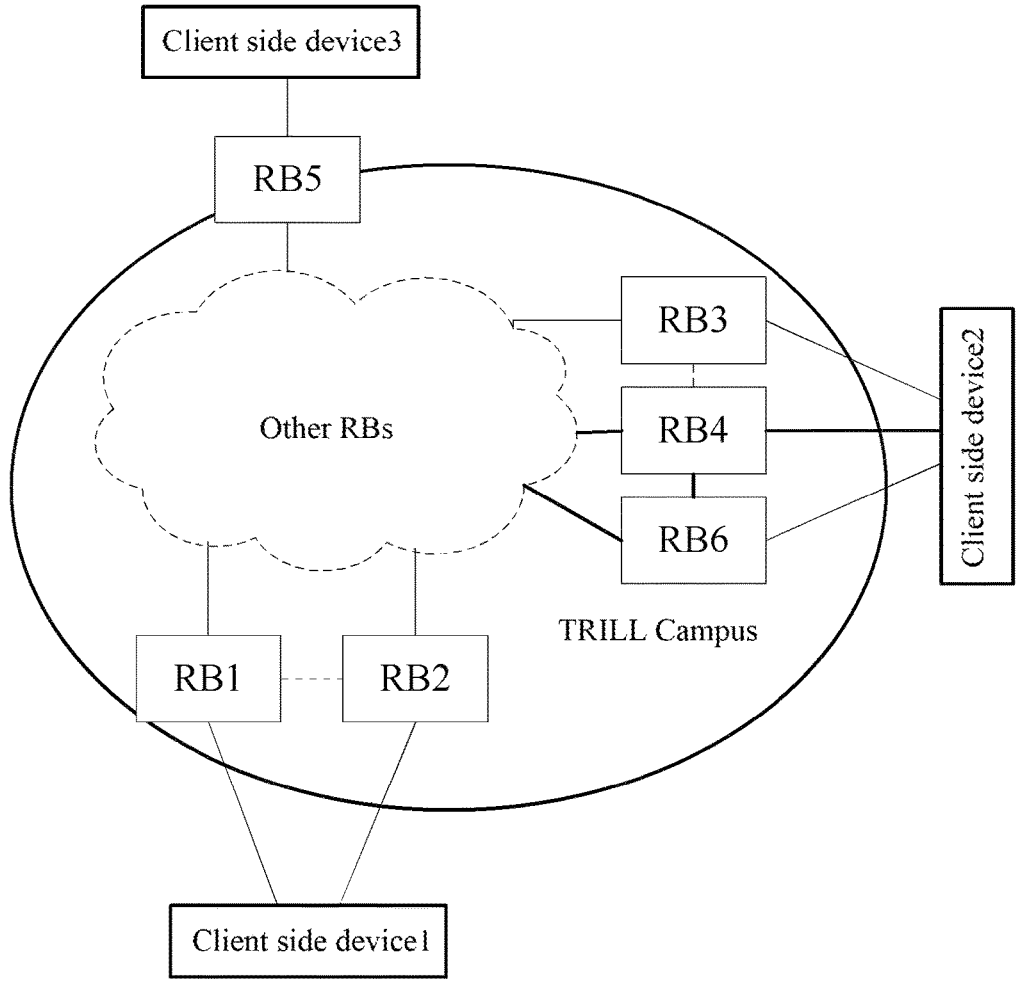
FIG. 1 is a schematic diagram of a network scenario according to the related technology.

In the network scenario shown in FIG. 1, the edge RB1 and RB2 are bound through a cross-device link and provided to the multi-chassis access of the client side device 1, so as to form an MC-LAG. The edge RB3, RB4 and RB6 are bound through the cross-device links and provided to the multi-chassis access of the client side device 2, so as to form another MC-LAG. As a remote edge RB, the RB5 needs to learn the same MAC1 ITEM which is issued by the RB1 and the RB2 through the ESADI as well as the MAC2 ITEM which is issued by the RB3, the RB4 and the RB6 through the ESADI. Wherein, the nicknames of the RB1, the RB2, the RB3, the RB4, the RB5 and the RB6 are nickname1, nickname2, nickname3, nickname4, nickname5 and nickname6 respectively, and their SYSTEM IDs are 1111.1111.1111, 2222.2222.2222, 3333.3333.3333, 4444.4444.4444, 5555.5555.5555, and 6666.6666.6666 respectively. All of the RB1, the RB2, the RB3, the RB4 and the RB5 belong to a native access VLAN1.

When the client side device accesses the TRILL network in the manner of multi-chassis access, the interface of the multi-chassis access edge RB will correspondingly sense a multi-chassis action. For example, the SYSTEM ID of the RB1 is 1111.1111.1111, and the SYSTEM ID of the RB2 is 2222.2222.2222, a binding SYSTEM-ID list <SYSTEM-ID 1> . . . <SYSTEM-ID N> is manually configured at the interface of the RB1, wherein N denotes the other Nth interface forming a binding relationship with this interface. If a double-chassis is formed only with the interface of the RB2, then it is only needed to configure a command forming a binding relationship of multi-chassis access with the SYSTEM ID or nickname of the RB2. By taking the SYSTEM-ID configuration for example, the command herein is binding SYSTEM-ID-list 2222.2222.2222. The command forming a binding relationship of multi-chassis access with the SYSTEM ID of the RB1 and configured at the interface of the RB2 is binding SYSTEM-ID-list 1111.1111.1111. In such a manner, the two interfaces of the RB1 and the RB2 form the same binding relationship of multi-chassis access. Certainly, it may also be sensed according to other configurations of IEEE 802.1 AX-REV, which automatically giving the binding relationship.

So, when a native terminal MAC address learned by these local interfaces needs to be issued to the remote device through the ESADI, for solving the existing learning mode of one-to-one mapping between the remote edge device and the MAC or the nickname, the ESAID protocol packet of the control plane inserts an MC-LAG sub-TLV in the MAC ITEM of the MAC-Reachability TLV. If the E bit in the MAC-Reachability TLV is set as 1, then it is indicated that the TLV supports multiple MAC ITEM carried. The SYSTEM IDs of other RBs in the same LAG as the RB are listed in the MC-LAG sub-TLV, which indicates that the MAC address has the MC-LAG relationship with the RBs of these SYSTEM IDs. For example, the MC-LAG sub-TLV issued by the RB1 carries the SYSTEM-ID of the RB2, and the MC-LAG sub-TLV issued by the RB2 carries the SYSTEM-ID of the RB1.

When receiving the ESADI packet carrying the MC-LAG sub-TLV which is sent by the RB1 and the RB2, the remote edge RB5 creates a realization different from the existing MAC address learning mechanism, that is, when accessing in the manner of multi-chassis access, the same terminal determines, through the information in the MC-LAG sub-TLV which is carried by the ESADI in the RB1 and the RB2, the MC-LAG sub-TLVs containing the SYSTEM IDs of each other between the RB1 and the RB2. A mapping table of the MAC address and the nickname on the remote edge RB5 will not be covered frequently, but can be stored at the same time. The TRILL MAC ITEM <MAC, VLAN; nickname1, nickname2> is issued.

Embodiment 2: ITEM calculation and issuing of the specific implementation method in the Trill technology in the present alternative embodiment.

The edge RB5 in the embodiment 1 determines the MC-LAG sub-TLVs containing the SYSTEM-IDs of each other between the RB1 and the RB2 aiming at the MAC1 which is provided by the RB1 and the RB2. So the RB1 and the RB2 form a MAC provider unit. When its TRILL MAC ITEM <MAC1, VLAN; nickname1, nickname2> is issued to a forwarding plane chip, when the chip has the capability of mapping the same MAC/VLAN to multiple ITEMs at the same time, the two ITEMs are issued at the same time, so it is feasible to select an egress RB in any way to encapsulate the native data packet of the same MAC/VLAN on the forwarding plane, and then forward the encapsulated packet in a unicast way. Optionally, when multiple flows of a certain destination MAC address are received, if the destination MAC address corresponds to multiple overlay network device IDs in the same LAG, then the different flows are encapsulated differently according to the multiple overlay network device IDs and sent to the destination MAC address.

When the MAC1 is migrated from the RB1 and the RB2 to the client side device 2 under the RB3, the RB4 and the RB6, because the RB3, the RB4 and the RB6 form another LAG, the LSP in the ESADI VLAN1 of the RB3, the RB4 and the RB6 carries information about the LAG, as shown in FIG. 6, the length field in the MAC ITEM indicates the total length of the sub-TLV behind the MAC ITEM. The added length of 1 byte shown in FIG. 6 indicates the total length of the sub-TLV which can be carried behind, and the specific extended sub-TLV is carried. The sub-TLV extension in the alternative embodiment is shown in FIG. 7 and FIG. 8. The sub-TLV extension carries the SYSTEM IDs of other devices forming the multi-chassis access relationship with the learned nickname of the MAC. Then, the MC-LAG sub-TLV issued by the RB3 carries the SYSTEM-IDs of the RB4 and the RB6. The MC-LAG sub-TLV issued by the RB4 carries the SYSTEM-IDs of the RB3 and the RB6. The MC-LAG sub-TLV issued by the RB6 carries the SYSTEM-IDs of the RB3 and the RB4. When the native MAC1 addresses of the RB1 and the RB2 do not age, both the LAG including the RB1 and the RB2 and the LAG including the RB3, the RB4 and the RB6 provide this MAC1, then the RB5 will find the source providers RB1, RB2, RB3, RB4 and RB6 of the MAC1 through the MAC-Reachability TLV of its ESADI-LSP. But by means of a mechanism of processing and determining the MC-LAG sub-TLV, the RB1 and the RB2 form the MAC1 provider unit of an LAG, whose confidence is 2, and the RB3, the RB4 and the RB6 form the MAC1 provider unit of another LAG, whose confidence is 6. Therefore, the TRILL MAC ITEM <MAC1, VLAN1; nickname3, nickname4, nickname6> of the provider unit generated by LAG formed by the RB3, the RB4 and the RB6 is issued finally.

Those ordinary skill in the art may understand that all or part of the steps in the above embodiments can be implemented by flows of a computer program. The computer program may be stored in computer readable storage medium. When the computer program is executed on corresponding hardware platforms (such as a system, a piece of equipment, a device and a component), one of the steps or a combination of the steps in the embodiment of the method is included.

Optionally, all or part of the steps of the above embodiments may also be implemented by using integrated circuits. These steps can be separately made into integrated circuit modules, or multiple modules or steps of them can be implemented by being made into a single integrated circuit module. In such a manner, the present document is not limited to any particular combination of hardware and software.

The respective device/functional module/functional unit in the above embodiments can be implemented by a general-purpose computing device, and they can be centralized in a single computing device or distributed on a network composed of multiple computing devices.

When being implemented in form of software function module and sold or used as an independent product, the respective device/functional module/functional unit in the above embodiments may also be stored in a computer-readable storage medium. The abovementioned computer-readable storage medium may be an ROM, a magnetic disk or a compact disk, and etc.

The above is only the alternative embodiment of the present document and not used to limit the present document. For those skilled in the art, the present document may have various modifications and changes. Any modifications, equivalent replacements, improvements and the like within the spirit and principle of the present document shall fall within the scope of protection of the present document.

INDUSTRIAL APPLICABILITY

As above mentioned, a notification method and device and an acquisition device for a MAC address of ESADI which are provided by the embodiments of the present document have the following beneficial effects: the problem in the related technology that the RB is unable to notify the remote RB of native multi-chassis RB IDs when accessing the TRILL network by a multi-chassis access is solved, so that the remote RB can acquire which RBs belong to the same MC-LAG, thereby improving the flexibility of the processing manner.

What is claimed is:

1. An announcement method for a Media Access Control (MAC) address of End Station Address Distribution Information(ESADI)comprising:
   issuing, by a first Routing Bridge (RB), a MAC address which is reachable natively by the first RB via a Link State Protocol (LSP) of the ESADI to a network; and
   announcing, by the first RB, MAC addresses of other RBs and the MAC address of the first RB through a MAC-Reachability Type Length Value (TLV) extension of the LSP,
   wherein the first RB and other RBs belong to a same Multi-Chassis Link Aggregation Group (MC-LAG),
   wherein the MAC-Reachability TLV extension of the LSP comprises:
   Identities (IDs) of the other RBs which belong to the same MC-LAG as the first RB in one or more MAC ITEMs of a MAC-Reachability TLV of the LSP, and wherein the MAC ITEM is an extension of a MAC address field in the MAC-Reachability TLV,
   wherein, after issuing, by the first RB, the MAC address which is reachable natively by the first RB via the LSP of the ESADI to the network, the method further comprises:
   receiving, by a remote Routing Bridge (RB), a first MAC-Reachability TLV extension of Link State Protocol (LSP) from the first RB,
   receiving, by the remote RB, one or more second MAC-Reachability TLV extensions of LSP from the other RBs;
   determining, by the remote RB, that MAC addresses of the other RBs and a MAC address of the first RB have a relationship and belong to the same MC-LAG according to the first and second MAC-Reachability TLV extensions of the LSP,
   wherein the determining comprises:
      acquiring, by the remote RB, the IDs of the other RBs, wherein the IDs of the other RBs are carried in one or more MAC ITEMs of the first MAC-Reachability TLV extension of the LSP,
      respectively determining that an ID of the first RB is carried in a MAC ITEM of the second MAC-Reachability TLV extensions of the LSP, and
      combining the MAC addresses of the first RB and the other RBs which have the relationship as belonging to the same MC-LAG into one MAC address providing unit;
   calculating, by the remote RB, a confidence of the MAC address providing unit, wherein the confidence is used for participating in a MAC ITEM calculation of Transparent Interconnection of Lots of Links (TRILL) of the MAC addresses.

2. The method according to claim 1, wherein, the MAC ITEM contains a MAC address with six bytes, a total length of a sub-TLV and one or more sub-TLVs, wherein, the one or more sub-TLVs contain the sub-TLVs which are set to describe the IDs of the other RBs belonging to the same MC-LAG as the first RB.

3. The method according to claim 2, wherein, the sub-TLVs which are set to describe the IDs of the other RBs belonging to the same MC-LAG as the first RB are SYSTEM-ID sub-TLVs of the other RBs belonging to the same MC-LAG as the first RB, wherein the sub-TLVs contain the SYSTEM-IDs which denote the other RBs belonging to the same MC-LAG as the first RB in an ESADI Intermediate System to Intermediate System (ISIS).

4. The method according to claim 3, wherein, announcing, by the first RB, by way of the MAC-Reachability TLV extension of the LSP comprises:
   the extension and announcement is defined through a specified type, or is identified through setting a RESV field in the MAC-Reachability TLV.

5. The method according to claim 2, wherein, the sub-TLVs which are set to describe the IDs of the other RBs belonging to the same MC-LAG as the first RB are nickname sub-TLVs of the other RBs belonging to the same MC-LAG as the first RB, wherein the sub-TLVs contain the nicknames which denote the other RBs belonging to the same MC-LAG as the first RB in an ESADI ISIS.

6. The method according to claim 2, wherein, announcing, by the first RB, by way of the MAC-Reachability TLV extension of the LSP comprises:
   the extension and announcement is defined through a specified type, or is identified through setting a RESV field in the MAC-Reachability TLV.

7. The method according to claim 1, wherein, the IDs of the other RBs belonging to the same MC-LAG as the first RB comprise:
   SYSTEM-IDs of the other RBs; or nicknames of the other RBs.

8. The method according to claim 7, wherein, announcing, by the first RB, by way of the MAC-Reachability TLV extension of the LSP comprises:
   the extension and announcement is defined through a specified type, or is identified through setting a RESV field in the MAC-Reachability TLV.

9. The method according to claim 1, wherein, announcing, by the first RB, by way of the MAC-Reachability TLV extension of the LSP comprises:

the extension and announcement is defined through a specified type, or is identified through setting a RESV field in the MAC-Reachability TLV.

10. The method according to claim 1, wherein, calculating, by the remote RB, the confidence of the MAC address providing unit comprises:
calculating, by the remote RB, that the confidence of the MAC address providing unit is a confidence of a RB with the highest confidence in RBs belonging to the same MC-LAG, wherein the confidence of the MAC address providing unit is used for a selection or decision among multiple MAC address providing units in the MAC ITEM calculation of the TRILL.

11. An announcement device for a Media Access Control (MAC) address of End Station Address Distribution Information (ESADI) which is in a first Routing Bridge (RB), comprising:
an announcement circuit, arranged to issue a MAC address which is reachable natively by the first RB via a Link State Protocol (LSP) of the ESADI to a network, and
announce MAC addresses of other RB and the MAC address of the first RB through a MAC-Reachability Type Length Value (TLV) extension of the LSP, wherein the first RB and other RBs belong to a same Multi-Chassis Link Aggregation Group (MC-LAG),
wherein the MAC-Reachability TLV extension of the LSP comprises:
Identities (IDs) of the other RBs which belong to the same MC-LAG as the first RB in one or more MAC ITEMs of a MAC-Reachability TLV of the LSP, and wherein the MAC ITEM is an extension of a MAC address field in the MAC-Reachability TLV, wherein a first MAC-Reachability TLV extension of LSP is received by a remote Routing Bridge (RB) from the first RB,
one or more second MAC-Reachability TLV extensions of LSP are received by the remote RB from the other RBs,
MAC addresses of the other RBs and a MAC address of the first RB are determined by the remote RB to have a relationship and belong to the same MC-LAG according to the first and second MAC-Reachability TLV extensions of the LSP, wherein MAC addresses of the other RBs and a MAC address of the first RB are determined by following steps:
acquiring, by the remote RB, the IDs of the other RBs, wherein the IDs of the other RBs are carried in one or more MAC ITEMs of the first MAC-Reachability TLV extension of the LSP,
respectively determining that an ID of the first RB is carried in a MAC ITEM of the second MAC-Reachability TLV extensions of the LSP, and
combining the MAC addresses of the first RB and the other RBs which have the relationship as belonging to the same MC-LAG into one MAC address providing unit
and
a confidence of the MAC address providing unit is calculated by the remote RB, wherein the confidence is used for participating in a MAC ITEM calculation of Transparent Interconnection of Lots of Links (TRILL) of the MAC addresses.

* * * * *